US010539961B2

(12) United States Patent
Christiansen et al.

(10) Patent No.: US 10,539,961 B2
(45) Date of Patent: Jan. 21, 2020

(54) STEERING CAPABILITY PREDICTION (71) Applicant: Ford Global Technologies, LLC, Dearborn, MI (US)

(72) Inventors: Jens Christiansen, Plymouth, MI (US); Eric She, Troy, MI (US)

(73) Assignee: Ford Global Technologies, Dearborn, MI (US)

(\*) Notice: Subject to any disclaimer, the term of this patent is extended or adjusted under 35 U.S.C. 154(b) by 405 days.

(21) Appl. No.: 15/340,120

(22) Filed: Nov. 1, 2016

(65) Prior Publication Data

US 2018/0120855 A1 May 3, 2018

(51) Int. Cl.
*G05D 1/02* (2006.01)
*B62D 6/00* (2006.01)
*G08G 1/16* (2006.01)

(52) U.S. Cl.
CPC ........... *G05D 1/0214* (2013.01); *B62D 6/002* (2013.01); *G08G 1/166* (2013.01)

(58) Field of Classification Search
CPC ...... B62D 6/002; G05D 1/0214; G08G 1/166; B60W 10/18; B60W 10/184; B60W 10/20; B60W 2520/14; B60W 30/09; B60W 30/0953; B60W 30/0956; B60W 30/18163
See application file for complete search history.

(56) References Cited

U.S. PATENT DOCUMENTS

| 5,913,919 A | 6/1999 | Bauer et al. |
| 8,762,043 B2 | 6/2014 | Eidenhall et al. |
| 2009/0319113 A1* | 12/2009 | Lee ............. B62D 15/025 701/25 |
| 2010/0131142 A1* | 5/2010 | Deng ............. B60T 7/18 701/65 |
| 2011/0231052 A1* | 9/2011 | Ellis ............. B60T 7/12 701/31.4 |
| 2013/0096778 A1* | 4/2013 | Goto ............. B62D 5/008 701/41 |
| 2014/0379216 A1 | 12/2014 | Park |
| 2015/0291210 A1* | 10/2015 | Kageyama ........ B60T 8/1755 701/41 |
| 2016/0091325 A1* | 3/2016 | Takamatsu ........ B60W 30/12 701/408 |

(Continued)

FOREIGN PATENT DOCUMENTS

| CN | 107292048 A | 10/2017 |
| DE | 102012010130 A1 | 12/2012 |

(Continued)

OTHER PUBLICATIONS

Search Report from the United Kingdom Intellectual Property Office dated Mar. 29, 2018 regarding GB Application No. 1717545.6 (5 pages).

*Primary Examiner* — Kira Nguyen (74) *Attorney, Agent, or Firm* — Frank A. MacKenzie; Bejin Bieneman PLC (57) ABSTRACT

Vehicles can be equipped to operate in both autonomous and occupant piloted mode. A computing device included in a vehicle can determine estimated steering velocities for a steering system of a vehicle as a function of respective steering angles and time steps and determine a path for the vehicle to travel based on the estimated steering velocities.

20 Claims, 6 Drawing Sheets

(56) References Cited

U.S. PATENT DOCUMENTS

| | | | |
|---|---|---|---|
| 2016/0107682 A1* | 4/2016 | Tan | B62D 6/00 |
| | | | 701/41 |
| 2016/0132058 A1* | 5/2016 | Lee | G05D 1/0214 |
| | | | 701/26 |
| 2016/0152239 A1* | 6/2016 | Kondoh | B60W 50/06 |
| | | | 701/1 |
| 2017/0066475 A1* | 3/2017 | Kudo | B62D 6/008 |
| 2017/0240205 A1 | 8/2017 | Nakada et al. | |
| 2018/0022358 A1* | 1/2018 | Fung | B60W 40/08 |
| | | | 701/36 |

FOREIGN PATENT DOCUMENTS

| | | |
|---|---|---|
| GB | 2546869 A | 8/2017 |
| GB | 2553429 A | 3/2018 |
| JP | 2005122272 A | 5/2005 |

* cited by examiner

STEERING CAPABILITY PREDICTION

BACKGROUND

Vehicles can be equipped to operate in both autonomous and occupant piloted mode. A computing device included in vehicle can be required to determine one or more paths for a vehicle to travel. Determining one or more paths can include determining one or more roads and determining one or more traffic obstacles.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting we mean directing the movements of a vehicle so as to move the vehicle along a roadway or other portion of a path.

Figure 1:
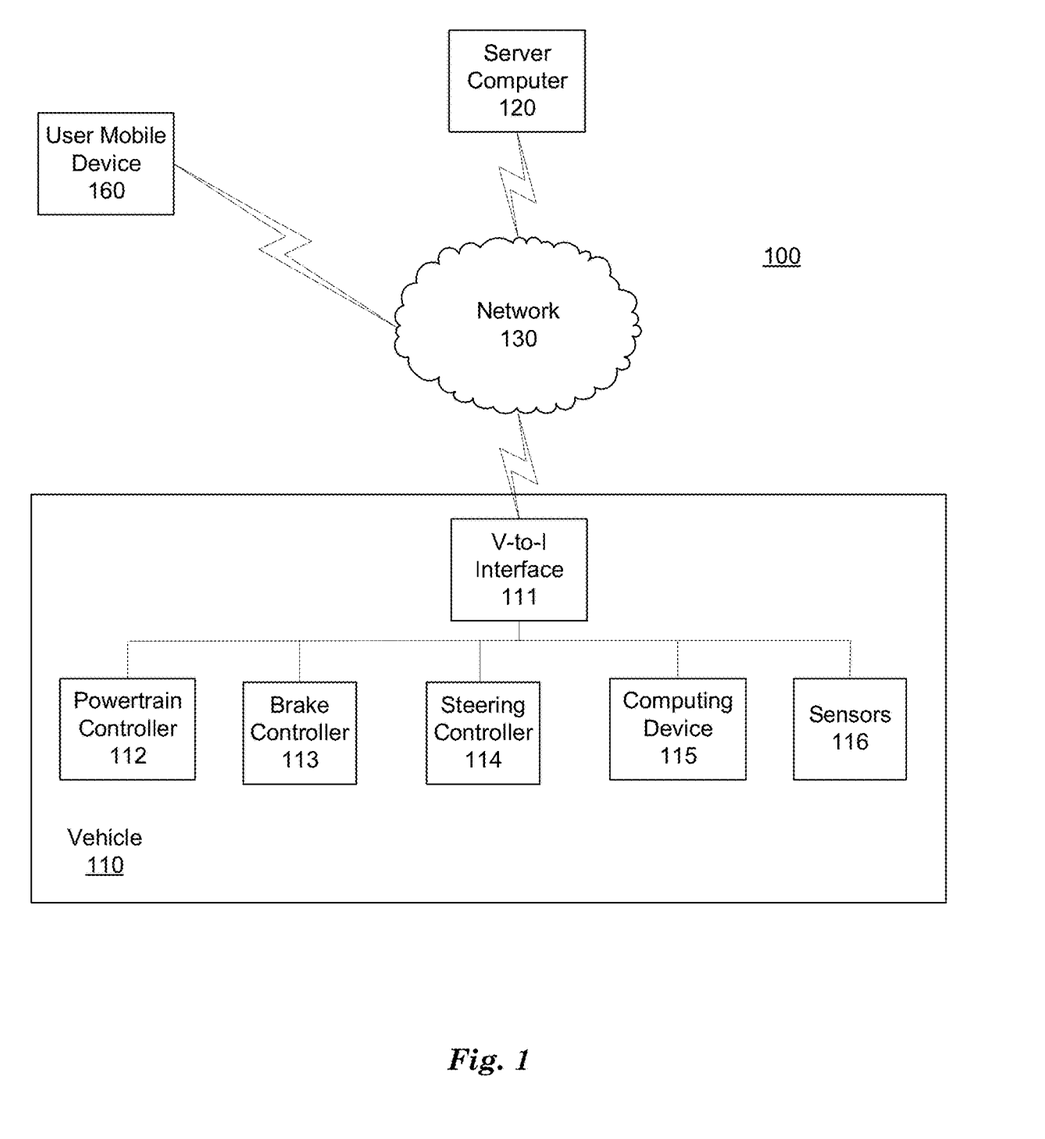
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing device 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as are known. Computing device can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Estimated steering velocities can be used by computing device 115 to determine which path of a plurality of possible paths for vehicle 110 to travel. Estimated steering velocities are the rates at which vehicle 110 can change direction per unit time based on steering angle. Computing device 115 can also download mapping and weather information from a remote server computer 120 via the network 130 via V-to-I interface 111 to combine with local information determined by sensors 116 and from nearby vehicles by vehicle-to-vehicle (V-to-V) communication via network 130 based on BLUETOOTH® capability included in V-to-I interface 111, for example, to determine the plurality of possible paths. Computing device 115 can use estimated steering velocities to select a path of the plurality of possible paths and direct controllers 112, 113, 114 cause vehicle 110 to travel the selected path.

Figure 2:
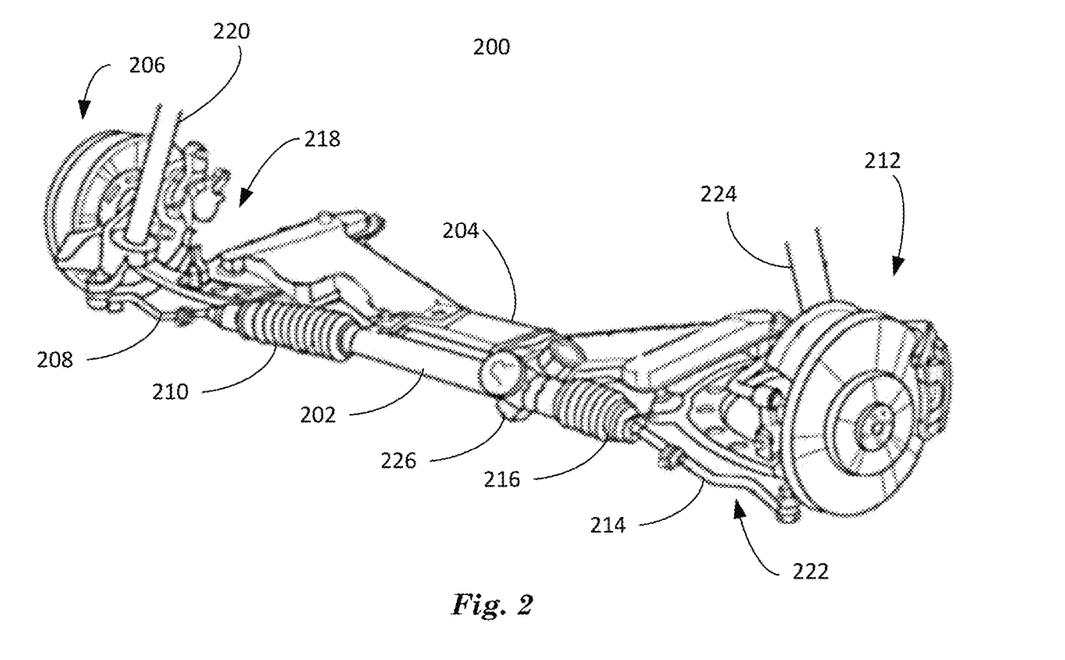
FIG. 2 is a diagram of an example steering subassembly.

FIG. 2 is a diagram of a steering subassembly 200 of vehicle 110. Steering subassembly 200 can be part of a vehicle 110 body. Vehicle 110 body may support the vehicle 110 and may be of unibody or body-on-frame construction and includes chassis components including suspension and wheels, for example. Vehicle 110 body includes exterior surfaces of vehicle 110 including hoods, windows, doors, lids or hatches and interior spaces of vehicle including occupant compartments, trunks and engine bay, for example. Exterior portions of vehicle 110 body may present a Class-A, e.g. substantially defect free, finely-finished surface appearance, and can be of any functionally suitable material, such as painted steel, aluminum and plastic, etc.

Steering subassembly 200 includes a steering rack 202 and steering gear 226 attached to a sub-frame 204, a part of vehicle 110 body. Steering rack 202 is operatively joined to right axle assembly 206 by right tie rod 208. The connection between steering rack 202 and right tie rod 208 is protected by right flexible boot 210. In similar fashion steering rack 202 is operatively joined to left axle assembly 212 by left tie rod 214. The connection between steering rack 202 and left tie rod 214 is protected by left flexible boot 216. Right axle assembly 206 is operatively joined to sub-frame 204 and vehicle 110 body by right control arm 218 and right strut 220. Similarly, left axle assembly 212 is operatively joined to sub-frame 204 and vehicle 110 body by left control arm 222 and right strut 224.

Steering gear 226 and steering rack 202 combine to convert rotary motion of the steering gear 226 to linear motion of the steering rack 202. Linear motion of the steering rack 202 is transferred to the axle assemblies 206, 212 via the tie rods 208, 214 to combine with the right and left control arms 218, 222 and right and left struts 220, 224 to cause the right and left axle assemblies 206, 212 to turn on substantially parallel, substantially vertical axes substantially perpendicular to a road surface supporting vehicle 110. Steering gear 226 is operatively connected to steering controller 114 to rotate on commands from computer 115 and thereby produce linear motion of tie rods 208, 214.

Small and equal deviations from exact vertical orientation of the vertical axes are referred to as steering caster. Steering caster is a deviation from exact vertical orientation of the vertical axes of the right and left axle assemblies 206, 212 wherein the vertical axes are rotated in planes parallel with the direction vehicle 110 moves when moving straight ahead and perpendicular to the road. Causing the vertical axes of left axle assembly 212 to deviate from exact vertical orientation in this fashion can improve steering ability of vehicle 110 by improving directional stability, for example. Steering caster can also determine, at least in part, the relationship between steering angle and steering force.

Figure 3:
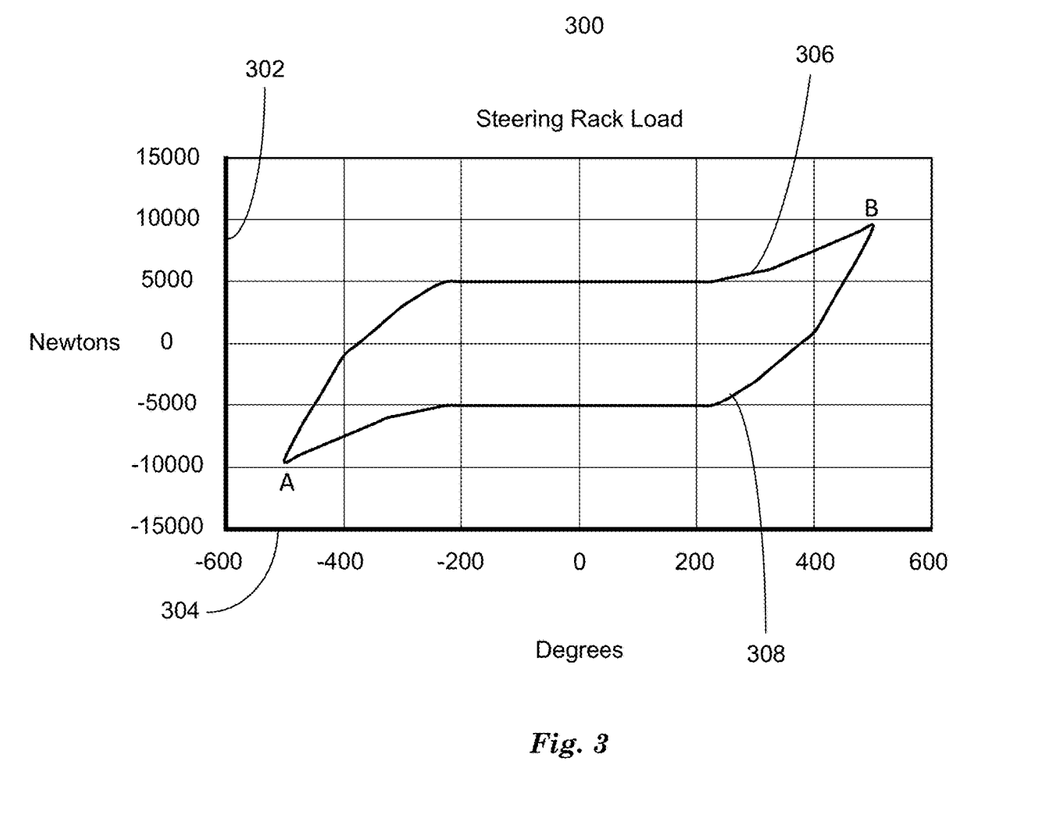
FIG. 3 is a diagram of an example graph of rack load vs. angle.

FIG. 3 is a steering rack load graph 300 showing rack loads 302, measured in newtons on the Y-axis, vs. steering angles 304, measured in degrees on the X-axis for steering subassembly 200 having steering caster as discussed above. Rack loads 302 are determined by measuring force generated between steering rack 202 and tie rods 208, 214 as a function of steering gear 226 steering angles 304, measured in degrees, and steering direction, which can be either clockwise (CW) or counter-clockwise (CCW) with respect to steering gear 226.

CW load curve 306 indicates rack load 302 in newtons as the steering gear 226 is turned from all the way from a left mechanical limit or stop at point "A" to all the way to a right mechanical limit or stop at point "B". This can be referred to as turning steering gear 226 from left lock to right lock or simply lock-to-lock. CCW load curve 308 indicates rack load 302 in newtons as steering gear 226 is turned all the way from a right mechanical limit or stop at point "B" to all the way to a right mechanical limit or stop at point "B" or right lock to left lock or lock-to-lock.

Steering gear 226 and steering rack 202 convert rotary motion of steering gear 226 into linear motion of steering rack 202. Since steering rack 202 load can be a vector quantity based on linear motion of steering rack 202 and tie rods 208, 214, moving the steering rack 202 in opposite directions changes the sign, making rack loads 302 associated with CW load curve 306 positive, and rack loads 302 associated with CCW load curve 308 negative, by convention. Both CW and CCW curves indicate relatively constant rack load over a range from about −200 degrees to about +200 degrees, and increasing force required to move from about −200 degrees to about −500 degrees (A), and about +200 degrees to about +500 degrees (B), due to steering caster as discussed above.

Figure 4:
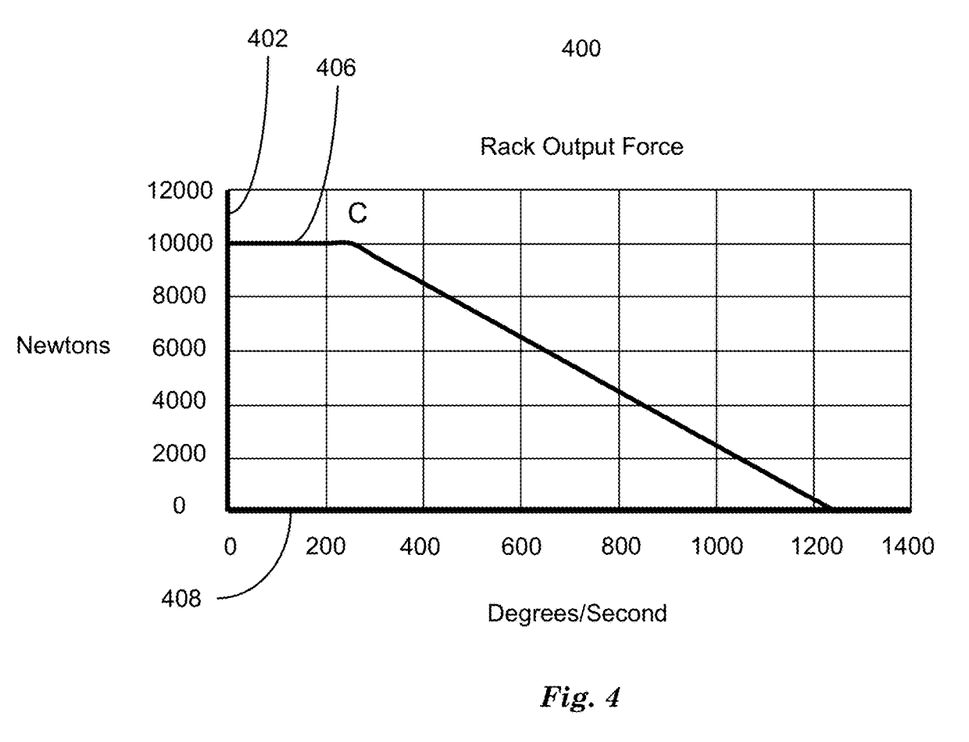
FIG. 4 is a diagram of an example graph of rack output force vs. steering speed.

FIG. 4 is a graph of rack output force 400 showing steering rack 202 output force 402 in newtons on the Y-axis vs. steering speed 408 in degrees/second on the X-axis. Output force 402 is the amount of force steering rack 202 applies to tie rods 208, 214 in newtons and steering speed 408 is the rate at which steering gear 226 is being rotated in degrees/second. The steering system output curve 406 shows relatively high constant output for steering speeds up to point "C" corresponding to steering speeds of about 200 degrees/second. At steering speeds above about 200 degrees/second, rack output force drops linearly with increasing steering speed. Combining rack load graph 300 with rack output graph 400 yields possible steering speeds for vehicle 110 as a function of steering angle.

Figure 5:
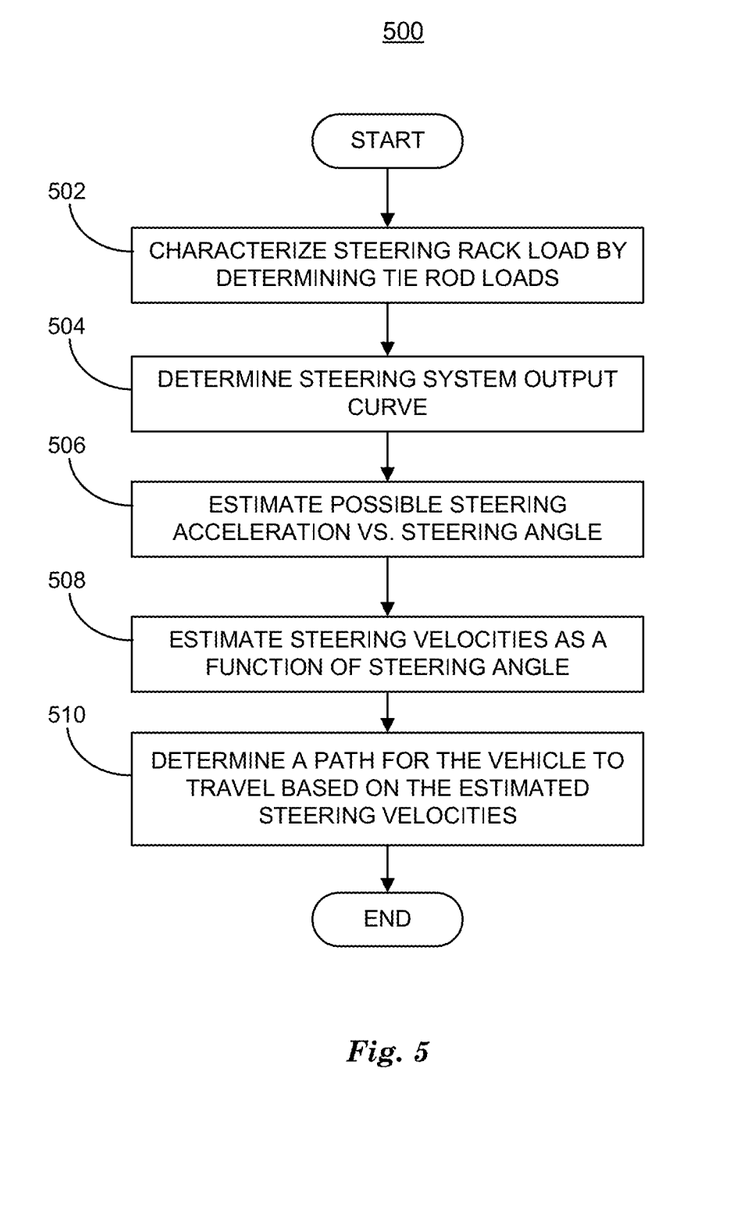
FIG. 5 is a flowchart diagram of an example process to determine a path for a vehicle based on estimated steering velocities.

FIG. 5 is a diagram of a flowchart, described in relation to FIGS. 1-4, of a process 500 for piloting vehicle 110 in autonomous operation. Process 500 can be implemented by a processor of computing device 115, taking as input information from sensors 116, and executing instructions and sending control signals via controllers 112, 113, 114, for example. Process 500 includes multiple steps taken in the disclosed order. Process 500 also includes implementations including fewer steps or can include the steps taken in different orders.

Process 500 starts at step 502, where computing device 115 characterizes steering rack load 300 by determining tie rod 208, 214 loads at various steering angles 304. An example of steering rack load 300 characterized determining tie rod 208, 214 loads at various steering angles is given by CW and CCW load curves 306, 308 as discussed in relation to FIG. 3 above. At step 504 computing device 115 determines a steering system output curve 406 as a function of steering speed 408. Steering system output curve 406 is the amount of rack output force 400 generated by steering rack 202 as discussed above in relation to FIG. 4.

At step 506 computing device 115 estimates possible steering acceleration as a function of steering angle. Steering acceleration is proportional to the rate of change of steering speed 408 and is therefore the second derivative of steering angle 304. The higher the estimated steering acceleration, the more quickly vehicle 110 is turning. The more quickly vehicle 110 turns, the more centripetal force, measured in g's, is generated perpendicular to the path.

Too little steering acceleration can prevent vehicle 110 from traveling a desired path by under steering. Too high a steering acceleration can prevent vehicle from traveling a desired path by over steering. Too high a steering acceleration can also generate too much centripetal force, which can be upsetting to occupants and in limiting cases can cause vehicle 110 to break traction and skid or otherwise lose control, possibly causing vehicle 110 to collide with another vehicle 110 or property, for example.

Estimated possible steering acceleration can be determined to be above a predetermined lower limit and below a predetermined upper limit, for example. Estimated possible steering acceleration can be determined as a function of steering angle 304, e.g., what estimated possible steering accelerations can cause vehicle 110 to change from a first steering angle 304 to a second steering angle 304 in what respective time periods. At step 508, computing device 115 estimates steering velocities as a function of steering angle 304. Steering velocities are the first integral with respect to time of estimated possible steering accelerations. Estimated steering velocities are proportional to the rate at which steering gear 226 is turning to change from a first steering angle 304 to a second steering angle 304.

At step 510 computing device 115 determines a path for the vehicle based on the estimated steering velocities 408. Computing device 115 can determine a path for a vehicle 110 based on a steering goal for vehicle 110, e.g. "change lanes" or "turn right at the intersection", by determining changes in steering angle 304. Knowing estimated possible steering accelerations permits computing device 115 to determine one or more steering velocities 408 that will change the steering angle 304 to the desired steering angle 304 having the lowest steering acceleration consistent with the desired steering time, for example.

Figure 6:
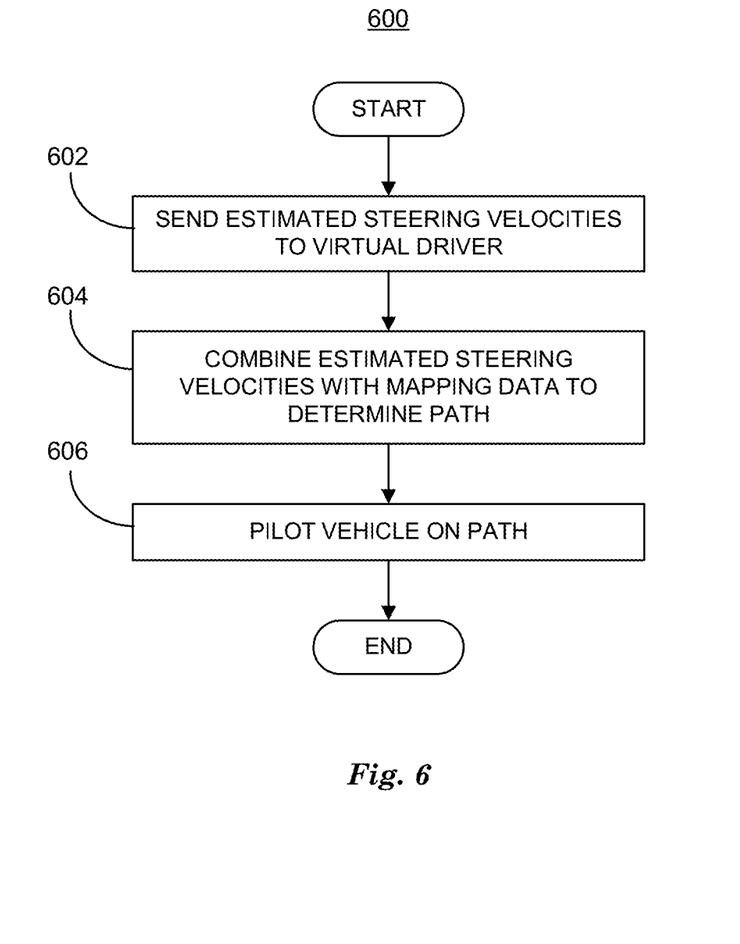
FIG. 6 is a flowchart diagram of a further example process to determine a path for a vehicle based on estimated steering velocities.

FIG. 6 is a diagram of a flowchart, described in relation to FIGS. 1-4, of a process 600 for piloting vehicle 110 in autonomous operation. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 can be executed as part of step 510 of FIG. 5, where computing device 115 according to process 500 determines a path for the vehicle to travel based on the estimated steering velocities. Step 510 can pass execution to step 602 of FIG. 6, where computing device 115 determines a path for vehicle 110 based on the estimated steering velocities as discussed above in relation to FIG. 4 and can then output signals to controllers 112, 113, 114 to cause vehicle 110 to travel the path.

At step 604 the computing device 115 can also input information from external sources such as remote server computer 120 or nearby vehicles via V-to-I interface 111 as discussed above in relation to FIG. 1. This information can include mapping information that describes the immediate surroundings of vehicle 110 and GPS information that describes the location of vehicle 110 with respect to the mapping information and can be combined with the estimated steering velocities 408 to determine a path for vehicle 110.

At step 606 computing device 115 can pilot vehicle 110 on the determined path. Computing device 115 can send signals to controllers 112, 113, 114 to cause vehicle 110 to travel the determined path including signals to steering controller 114 to command steering gear to turn at the determined steering speeds for the determined time periods and thereby cause steering angle 304 to change to the desired value in the desired time period. Determining the steering velocities 408 that will change the steering angle 304 to the desired value in the desired time period while maintaining steering acceleration at predetermined levels can determine a path for the vehicle 110.

For example, computing device 115 can determine a plurality of possible paths to travel to follow a road or avoid an obstacle. Estimated steering velocities can be combined with vehicle speed and local information regarding external conditions including weather, for example, to determine the possible paths that are achievable based on steering force and estimates of vehicle 110 traction in different weather conditions.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention

We claim:

1. A method, comprising:
    determining a plurality of estimated steering velocities for a steering system of a vehicle, wherein each of the steering velocities is a rate at which the vehicle can change direction in a respective period of time based on a respective steering angle in the respective period of time;
    determining a path for the vehicle to travel based on the estimated steering velocities at each of respective periods of time; and
    controlling the vehicle to operate along the path according to the estimated steering velocities.

2. The method of claim 1, wherein the rate for each of the estimated steering velocities is determined as a function of applied steering force and the steering angle in the respective period of time.

3. The method of claim 2, wherein the steering angle in each respective period of time is based on estimating possible steering acceleration.

4. The method of claim 1, wherein determining the estimated steering velocities includes:
    determining tie rod loads over steering travel at various speeds to obtain a steering rack load; and
    determining a system output curve of the steering velocities that includes actuator force as a function of the steering rack load.

5. The method of claim 1, further comprising:
    providing the estimated steering velocities as input for autonomous or semi-autonomous operation of the vehicle.

6. The method of claim 1, further comprising:
    combining the estimated steering velocities with vehicle state information and map data to determine the path for the vehicle to travel.

7. The method of claim 6, wherein the vehicle state information includes vehicle location, speed and direction.

8. The method of claim 6, wherein the map data includes roads and traffic obstructions including other vehicles, pedestrians and traffic barriers.

9. The method of claim 8, wherein the path includes roads and avoids traffic obstructions.

10. An apparatus, comprising:
    a processor;
    a memory, the memory storing instructions executable by the processor to:
        determine a plurality of estimated steering velocities for a steering system of a vehicle, wherein each of the steering velocities is a rate at which the vehicle can change direction in a respective period of time based on a respective steering angle in the respective period of time; and determine a path for the vehicle to travel based on the estimated steering velocities at each of respective periods of time; and control the vehicle to operate along the path according to the estimated steering velocities.

11. The apparatus of claim 10, wherein the rate for each of the estimated steering velocities is determined as a function of applied steering force and the steering angle in the respective period of time.

12. The apparatus of claim 11, wherein the steering angle in each respective period of time is based on estimating possible steering acceleration.

13. The apparatus of claim 10, wherein determining the estimated steering velocities includes:

determining tie rod loads over steering travel at various speeds to obtain a steering rack load; and determining a system output curve of the steering velocities that includes actuator force as a function of the steering rack load.

14. The apparatus of claim 10, the memory storing further instructions to:

providing the estimated steering velocities as input for autonomous or semi-autonomous operation of the vehicle.

15. The apparatus of claim 10, the memory storing further instructions to:

combining the estimated steering velocities with vehicle state information and map data to determine the path for the vehicle to travel.

16. The apparatus of claim 15, wherein the vehicle state information includes vehicle location, speed and direction.

17. The apparatus of claim 15, wherein the map data includes roads and traffic obstructions including other vehicles, pedestrians and traffic barriers.

18. The apparatus of claim 17, wherein the path includes roads and avoids traffic obstructions.

19. A vehicle, comprising a computing device including:
a processor;
a memory, the memory storing instructions executable by the processor to:

determine a plurality of estimated steering velocities for a steering system of a vehicle, wherein each of the steering velocities is a rate at which the vehicle can change direction in a respective period of time based on a respective steering angle in the respective period of time; and determine a path for the vehicle to travel based on the estimated steering velocities at each of respective periods of time; and control the vehicle to operate along the path according to the estimated steering velocities.

20. The vehicle of claim 19, wherein the rate for each of the estimated steering velocities is determined as a function of applied steering force and the steering angle in the respective period of time.

* * * * *

UNITED STATES PATENT AND TRADEMARK OFFICE
CERTIFICATE OF CORRECTION

PATENT NO. : 10,539,961 B2
APPLICATION NO. : 15/340120
DATED : January 21, 2020
INVENTOR(S) : Jens Christiansen et al.

Page 1 of 1

It is certified that error appears in the above-identified patent and that said Letters Patent is hereby corrected as shown below:

In the Claims

Column 9, Line 3, Claim 10: delete "and" after "period of time;".

Column 10, Line 20, Claim 19: delete "and" after "period of time;".

Signed and Sealed this
Tenth Day of March, 2020

Andrei Iancu
*Director of the United States Patent and Trademark Office*